US009049243B2

(12) United States Patent
Shapiro et al.

(10) Patent No.: US 9,049,243 B2
(45) Date of Patent: Jun. 2, 2015

(54) SYSTEM AND METHOD FOR ALLOWING A USER TO OPT FOR AUTOMATIC OR SELECTIVELY SENDING OF MEDIA

(75) Inventors: Daniel J. Shapiro, Seattle, WA (US); Michael Arcuri, Seattle, WA (US)

(73) Assignee: Photobucket Corporation, Seattle, WA (US)

( * ) Notice: Subject to any disclaimer, the term of this patent is extended or adjusted under 35 U.S.C. 154(b) by 828 days.

(21) Appl. No.: 12/569,313

(22) Filed: Sep. 29, 2009

(65) Prior Publication Data

US 2010/0016003 A1 Jan. 21, 2010

Related U.S. Application Data

(63) Continuation-in-part of application No. 11/877,845, filed on Oct. 24, 2007, which is a continuation-in-part (Continued)

(51) Int. Cl.
*G06F 15/173* (2006.01)
*H04M 1/00* (2006.01)
(Continued)

(52) U.S. Cl.
CPC ............ *H04L 67/2814* (2013.01); *H04L 67/26* (2013.01); *H04L 43/0811* (2013.01);
(Continued)

(58) Field of Classification Search
CPC .................................................. H04L 43/0811
USPC ........... 709/238, 203; 379/88.13, 265.09, 908
See application file for complete search history.

(56) References Cited

U.S. PATENT DOCUMENTS 6,442,573 B1 8/2002 Schiller et al.
6,628,965 B1 9/2003 LaRosa et al.

(Continued)

FOREIGN PATENT DOCUMENTS

WO WO-2007/038766 4/2007

OTHER PUBLICATIONS

International Search Report and Written Opinion issued for PCT/US2006/038207; Dated: Jul. 31, 2008; 14 Pages.

(Continued)

*Primary Examiner* — Asghar Bilgrami
(74) *Attorney, Agent, or Firm* — Norton Rose Fulbright US LLP

(57) ABSTRACT

The present invention is directed to a system and method which allows for the seamless integration of the sending mechanism with the media acquiring mechanism of a portable device. In this manner the end-user has instant access to media sharing with complete control over how the media is shared. This integration is accomplished by presenting to the user a series of screens that are available directly from the media creation applications (e.g. cameras or audio recorders) and media viewing applications (e.g. photo galleries or screen savers) on the device. When a photo (or other media) is captured or viewed, a series of pre-established processing options, including on-device uses for the media, internet services and accounts, email addresses and/or phone numbers to which the media can be sent are presented to the user. Some options require no further user interaction. Defaults are also available which require no user interaction at all, combining together the manual selection of certain processing options or destinations with the automatic selection of other processing options or destinations. Thus, the sending process becomes essentially a selection process allowing the user to override defaults by either selecting from choices tailored to the user including already known address information of potential recipients or to allow the media to be automatically sent to a previously identified location according to the current "default" user preferences. In the situation where a new address or phone number is desired, the user can add such information in a simple and straight-forward manner.

38 Claims, 14 Drawing Sheets

Related U.S. Application Data of application No. 11/540,497, filed on Sep. 28, 2006, which is a continuation-in-part of application No. 11/732,507, filed on Apr. 2, 2007.

(60) Provisional application No. 60/721,262, filed on Sep. 28, 2005, provisional application No. 60/788,171, filed on Mar. 31, 2007.

(51) Int. Cl.
    *H04L 29/08*     (2006.01)
    *H04L 12/26*     (2006.01)
    *H04L 29/06*     (2006.01)
    *H04M 1/2745*     (2006.01)
    *H04M 1/725*     (2006.01)

(52) U.S. Cl.
    CPC ........ *H04L63/083* (2013.01); *H04M 1/274525* (2013.01); *H04M 1/72544* (2013.01); *H04M 1/72555* (2013.01); *H04M 2250/52* (2013.01); *H04M 2250/64* (2013.01)

(56) References Cited

U.S. PATENT DOCUMENTS

| | | | |
|---|---|---|---|
| 6,750,890 B1 * | 6/2004 | Sugimoto | 715/838 |
| 6,763,226 B1 * | 7/2004 | McZeal, Jr. | 455/90.2 |
| 6,914,695 B2 * | 7/2005 | Walters et al. | 358/1.15 |
| 7,050,836 B2 * | 5/2006 | Paakkonen | 455/567 |
| 7,068,643 B1 | 6/2006 | Hammond | |
| 7,284,040 B2 * | 10/2007 | Kobayashi et al. | 709/219 |
| 7,509,376 B2 * | 3/2009 | Mousseau et al. | 709/206 |
| 7,694,128 B2 * | 4/2010 | Judge et al. | 713/152 |
| 7,724,281 B2 | 5/2010 | Vale et al. | |
| 2002/0102966 A1 | 8/2002 | Lev et al. | |
| 2002/0113879 A1 | 8/2002 | Battle et al. | |
| 2002/0174206 A1 | 11/2002 | Moyer et al. | |
| 2003/0046447 A1 | 3/2003 | Kouperchliak et al. | |
| 2003/0081739 A1 * | 5/2003 | Hikishima | 379/88.01 |
| 2003/0146977 A1 | 8/2003 | Vale et al. | |
| 2003/0172127 A1 | 9/2003 | Northrup et al. | |
| 2003/0229667 A1 | 12/2003 | Pedersen et al. | |
| 2004/0070671 A1 | 4/2004 | Bengtsson | |
| 2004/0098569 A1 | 5/2004 | Smith et al. | |
| 2004/0109063 A1 | 6/2004 | Kusaka et al. | |
| 2004/0171371 A1 | 9/2004 | Paul | |
| 2004/0199611 A1 | 10/2004 | Bernhard et al. | |
| 2004/0199614 A1 | 10/2004 | Shenfield et al. | |
| 2004/0230670 A1 | 11/2004 | Schmidt-Karaca | |
| 2004/0268340 A1 | 12/2004 | Steeb et al. | |
| 2005/0036034 A1 | 2/2005 | Rea et al. | |
| 2005/0082370 A1 | 4/2005 | Frantz et al. | |
| 2005/0134691 A1 | 6/2005 | Cox | |
| 2006/0004914 A1 | 1/2006 | Kelly et al. | |
| 2006/0206592 A1 | 9/2006 | Fujii et al. | |
| 2007/0006150 A9 | 1/2007 | Walmsley | |
| 2007/0016659 A1 | 1/2007 | Peck et al. | |
| 2007/0061487 A1 | 3/2007 | Moore | |
| 2008/0279562 A1 | 11/2008 | Naoe et al. | |
| 2008/0301231 A1 | 12/2008 | Mehta et al. | |
| 2009/0031300 A1 * | 1/2009 | Vau et al. | 717/178 |
| 2009/0037515 A1 | 2/2009 | Zapata et al. | |
| 2009/0100166 A1 | 4/2009 | DeAnna et al. | |
| 2009/0111488 A1 * | 4/2009 | Vau et al. | 455/466 |
| 2009/0187756 A1 | 7/2009 | Nollet et al. | |
| 2009/0231441 A1 | 9/2009 | Walker et al. | |
| 2010/0182193 A1 | 7/2010 | Lin et al. | |
| 2010/0241597 A1 | 9/2010 | Chen et al. | |
| 2011/0218995 A1 | 9/2011 | Ayars et al. | |

OTHER PUBLICATIONS

Internaitonal Search Repoert and the Written Opinion issued for the the International PCT Applicaion No. PCT/US2008/77439, issued on Dec. 11, 2008; 10 pages.

* cited by examiner

SYSTEM AND METHOD FOR ALLOWING A USER TO OPT FOR AUTOMATIC OR SELECTIVELY SENDING OF MEDIA

CROSS-REFERENCE TO RELATED APPLICATIONS

This application is a continuation-in-part of U.S. patent application Ser. No. 11/877,845 filed Oct. 24, 2007, entitled "SYSTEM AND METHOD FOR AUTOMATIC TRANSFER OF DATA FROM ONE DEVICE TO ANOTHER"; which in itself is a continuation-in-part of U.S. patent application Ser. No. 11/540,497 filed Sep. 28, 2006, entitled "METHOD AND SYSTEM FOR ESTABLISHING A USER-FRIENDLY DAT TRANSFER SERVICE APPLICATION EXECUTING WITHIN A HETEROGENEOUS DISTRIBUTED SERVICE APPLICATION EXECUTION ENVIRONMENT; which itself claims priority to U.S. Provisional Patent Application No. 60/721,262 filed Sep. 28, 2005; U.S. patent application Ser. No. 11/540,497 is also a continuation in part of U.S. patent application Ser. No. 11/732,507 filed Apr. 2, 2007 which itself claims priority to U.S. Provisional Application No. 60/788,171 filed Mar. 31, 2007; and this application is related to U.S. patent application Ser. No. 12/111,492 filed Apr. 29, 2008, entitled "SYSTEM AND METHOD FOR CONTROLLING INTER-DEVICE MEDIA EXCHANGES"; and U.S. patent application Ser. No. 11/732,508 filed Apr. 2, 2007, entitled "METHOD AND SYSTEM FOR PHONE-NUMBER DISCOVERY AND PHONE-NUMBER AUTHENTICATION FOR MOBILE COMMUNICATIONS DEVICES"; all of the above-identified applications are hereby incorporated by reference herein.

TECHNICAL FIELD

This disclosure relates to the transfer of media from one device to another either automatically or under selective control of the sender.

BACKGROUND OF THE INVENTION

The above-identified applications are directed to various concepts in which media, such as photographs, text, audio, video, etc. created on one device are sent to another preselected device and/or internet service account. In certain embodiments, the photos are captured by a mobile device (cell phone, camera, etc.) and communicated to a home PC via an intermediary server. The photo capturing device automatically detects newly captured photos and automatically uploads each photograph to a particular set of destinations as pre-established by the user. The destinations could be, for example, email addresses, folders on a home computer and third party online albums, such as the websites at www.photobucket.com, www.flickr.com, www.myspace.com, etc.

In some situations, the user desires to be more fully in control of what is sent and the destination(s) of the photo to be sent. For example, sometimes a user has taken a picture and the user desires to have the picture sent to the website at www.facebook.com for public display. However, sending all newly created pictures to Facebook may not be desirable. Perhaps the user desires to store some pictures in a particular storage location (local or remote from the capturing device) or perhaps the user desires to have some pictures sent to a particular individual or set of individuals on a one-time basis. Sometimes it is desired to send only one or two from a whole set of pictures to a particular location. When photos are all sent automatically to pre-established locations, as discussed in the above-identified co-pending applications, such a selective distribution is difficult to control. For example, under the system as it exists today a user who did not want a photo, or set of photos, to automatically be sent to Facebook would have to 1) go into the settings, turn the Facebook routing off, 2) get out of the settings and take the picture, and 3) go back into the settings and turn Facebook back on when a picture is about to be taken that the user desires to be sent to Facebook. The procedure that must be followed when a user wants to control destinations is less than ideal because it requires the user to perform multiple separate operations and can become confusingly complicated. Also, since an automatic forwarding system requires the user to determine prior to creating the media where the media is to be sent, it is easy to forget to change the automatic sending destination. Thus, at certain times, media may be sent to the wrong location.

One current system that performs one-time send operations is the multimedia messaging service (MMS) which allows a user to 1) take a photo, 2) invoke a message composition function of the mobile device, 3) select the new photo (or even an old photo or message), 4) insert the selected picture or message, 5) enter a phone number (or in some implementations an email address) to which to send the picture, 6) send the selected picture or message, then 7) exit the message composition function. MMS implementations on mobile phones require a tedious set of operations and although this functionality has been available to the public for over ten years, only a relatively small set of the mobile phone users based in the United States regularly sends MMS messages; further, customer satisfaction with MMS-based products is poor. For example, in order to send ten different photos using the popular Motorola RAZR phone on the AT&T network, more than 100 keypresses are required.

BRIEF SUMMARY OF THE INVENTION

The present invention is directed to a system and method which allows for the seamless integration of the sending mechanism with the media acquiring mechanism of a portable device. In this manner the end-user has instant access to media sharing with complete control over how the media is shared. This integration is accomplished by presenting to the user a series of screens that are available directly from the media creation applications (e.g. cameras or audio recorders) and media viewing applications (e.g. photo galleries or screen savers) on the device. When a photo (or other media) is captured or viewed, a series of pre-established processing options, including on-device uses for the media, internet services and accounts, email addresses and/or phone numbers to which the media can be sent are presented to the user. Some options require no further user interaction. Defaults are also available which require no user interaction at all, combining together the manual selection of certain processing options or destinations with the automatic selection of other processing options or destinations. Thus, the sending process becomes essentially a selection process allowing the user to override defaults by either selecting from choices tailored to the user including already known address information of potential recipients or to allow the media to be automatically sent to a previously identified location according to the current "default" user preferences. In the situation where a new address or phone number is desired, the user can add such information in a simple and straight-forward manner.

In one embodiment, the integrated send operation works during browsing when a user sees an existing piece of media such as a photo, perhaps taken a month ago, or perhaps downloaded from another location or perhaps even received as an incoming message. In other embodiments, the creation of any kind of media or content (the recording of videos, the taking of a picture, the recording of music, the entry of text notes, etc.) could offer the same integrated send experience, tailored for the particular type of content that has just been created.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1A:
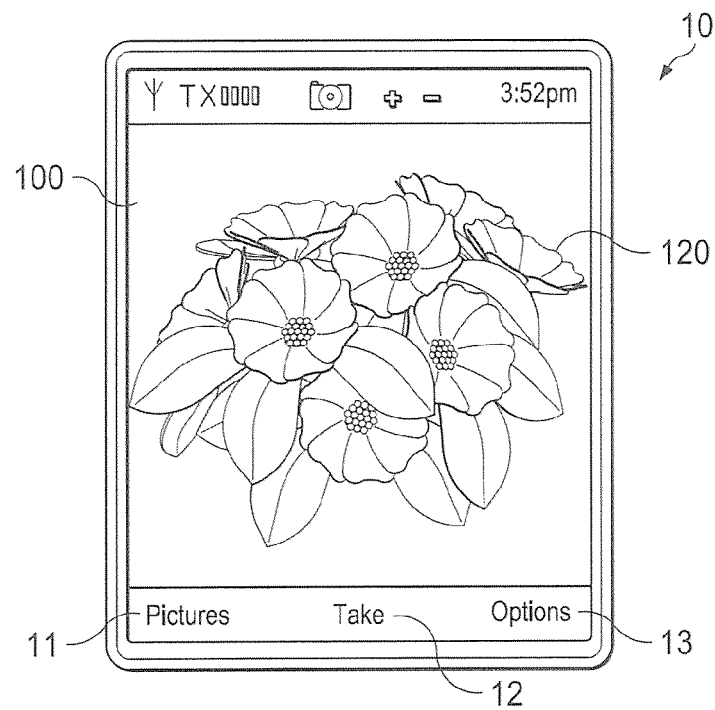
FIGS. 1A, 1B and 1C illustrate a sequence of media capture on a device and sending the captured media to a pre-established location.
Figure 1B:
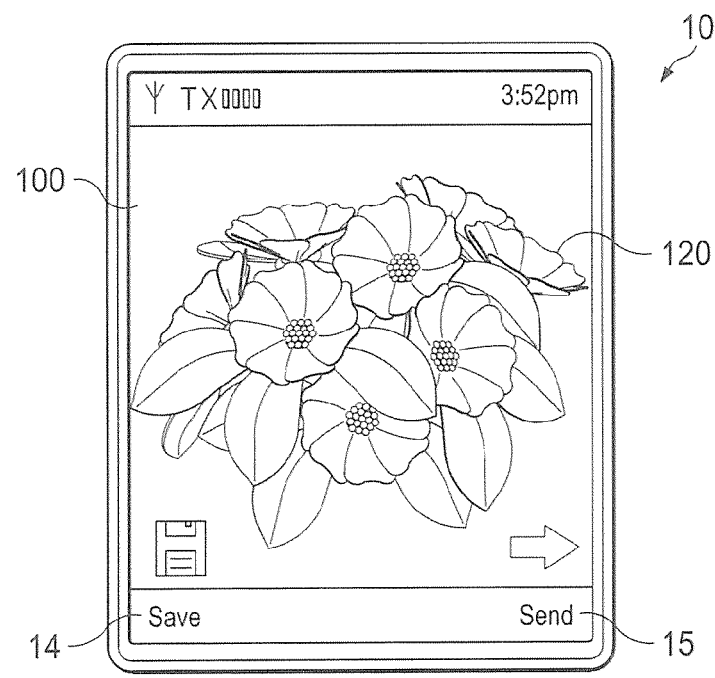
Figure 1C:
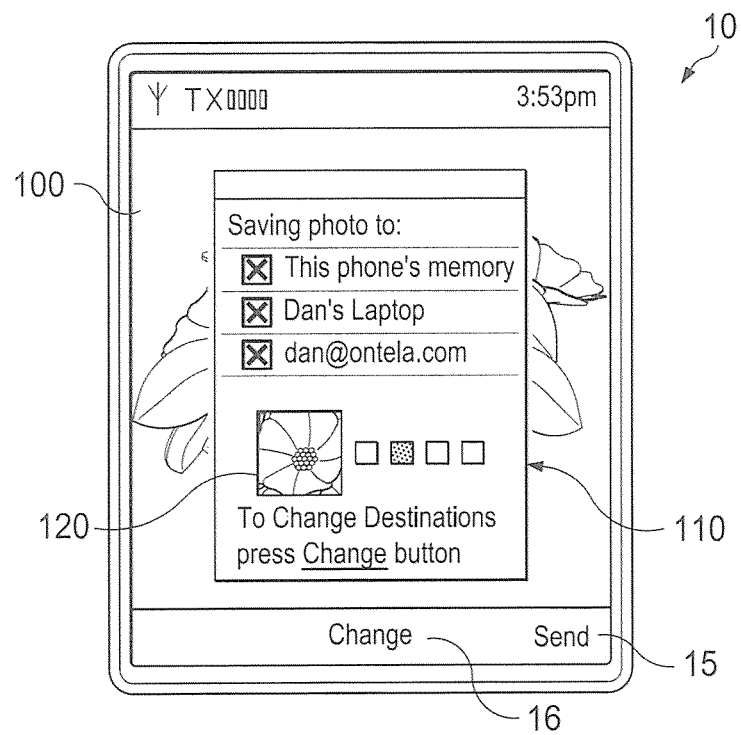

FIGS. 1A, 1B and 1C illustrate a sequence of media capture on a device, such as on a mobile cell phone, and sending the captured media to a pre-established location. The operations discussed with respect to FIGS. 1A, 1B and 1C are what we are calling the SAVE operation (the automatic transmission of a media file to default locations) and are discussed in more operational detail hereinafter and in the above-identified applications. It should be understood that the labels (such as SAVE, SEND, etc.) are representative only and that any name can be applied to a set of functions and it is the underlying functions that are important.

In FIG. 1A the user focuses viewer 100 of device 10 on object 120 to be captured photographically. Device 10 can be any device capable of taking (or receiving from another source) a photograph. As is well known, when the user positions object 120 in the viewfinder as he/she desires the user operates take button 12 to capture the desired image. Note that button 12, as are all the buttons to be discussed herein, can be physically moveable switches, softkeys, proximity switches, voice detectors, motion sensors, etc. operable to perform a function in response to user's desires. Buttons 11 and 13 can be used, if desired to provide the user with different options. Thus, for example, button 11 will allow the user to view other captured or received photos or messages, and button 13 will allow the user additional options, if desired.

FIG. 1B shows image 120 captured and displayed on viewfinder 100 of device 10. After the photo is captured two choices appear as buttons at the bottom of the viewfinder, namely the SAVE button 14 and the SEND button 15. If the user selects SAVE, then FIG. 1C illustrates an embodiment of a selection message, such as message 110, allowing the user options for the SAVE operation. These options pertain to what the user had previously selected, usually by entering information on a PC or using software on the device, but in some cases based upon what the user has selected from device 10 in previous operations of a similar nature. As shown, the selection the user has is to save the captured image 1) on the phone, 2) on the user's laptop and 3) at an email address. Note that the user could have configured the software differently such that when the user selected SAVE (in FIG. 1B) the screen shown in FIG. 1C would not have been displayed but the captured media would have automatically, without further user input, been saved directly at one or more of the pre-selected locations; or alternately, it could have paused on the screen shown in FIG. 1C until the user confirmed or changed the default choices. Note that one or more of the pre-identified locations can be remote from the capturing device and thus the media is sent to an ultimate or penultimate storage location.

Figure 2A:
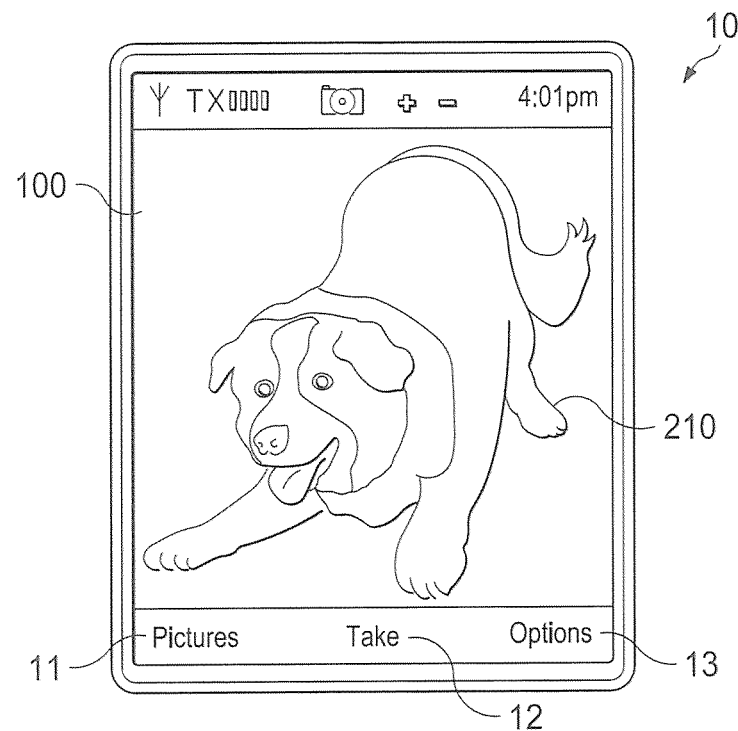
FIGS. 2A through 2H illustrate a sequence in which the user decides to send a captured picture to a specific location, or set of locations, rather than to allow the system to operate automatically.

One method for accomplishing such a media transfer is disclosed in one or more of the above-identified applications. In one embodiment, unless the user takes some action when the options of FIG. 1C are presented a timeout will occur and the pre-set options will automatically be performed. In such a situation, the user can be informed, perhaps by a displayed message, and perhaps simply by the view finder reverting back to the image capture mode, as shown in FIGS. 1A and 2A. Also note that, if desired, the system could give the user an option to save all captured media in the default locations, without confirmation, until "further notice". In such a situation, all newly captured media would be saved at the pre-identified location without prompting the user further. Perhaps, an icon can be displayed in the view finder when the "save always" feature is turned on as a reminder to the user that newly captured media will be saved automatically at various pre-identified locations. Note also that internal or local storage on the device is a location that could be selectable (not shown); if cleared, the software might only be stored remotely, or the data might be stored only temporarily on the local device and removed after the media is transferred.

FIGS. 2A through 2H illustrate a sequence in which the user decides to send a captured picture to a specific location, or set of locations, rather than to allow the system to operate automatically. Note that while the options discussed herein pertain to distribution of the media obtained on the device, one or more of the options can be directed to various processing options whether internal to the device or remote therefrom. In FIG. 2A, viewfinder 100 of device 10 is up and the user is about to take a picture of dog 210. When the dog is positioned in the viewfinder as desired, button 12 is enabled.

Figure 2B:
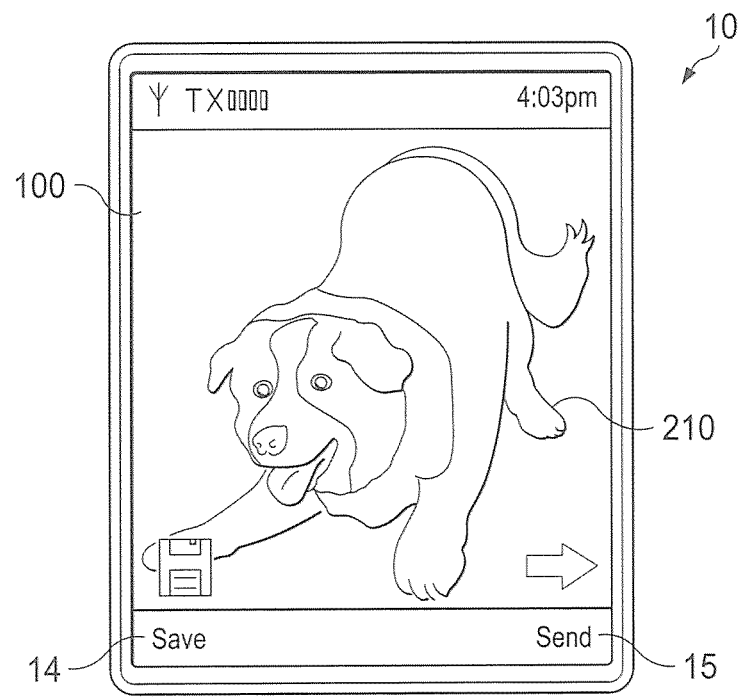

When the captured image appears in the viewfinder, as shown in FIG. 2B, the user enables the SEND option via key 15. Note that the system can be arranged such that if the user does not enable either button 14 or button 15 then the automatic save option is followed and the photo can be delivered to one or more pre-determined locations as discussed previously.

Figure 2C:
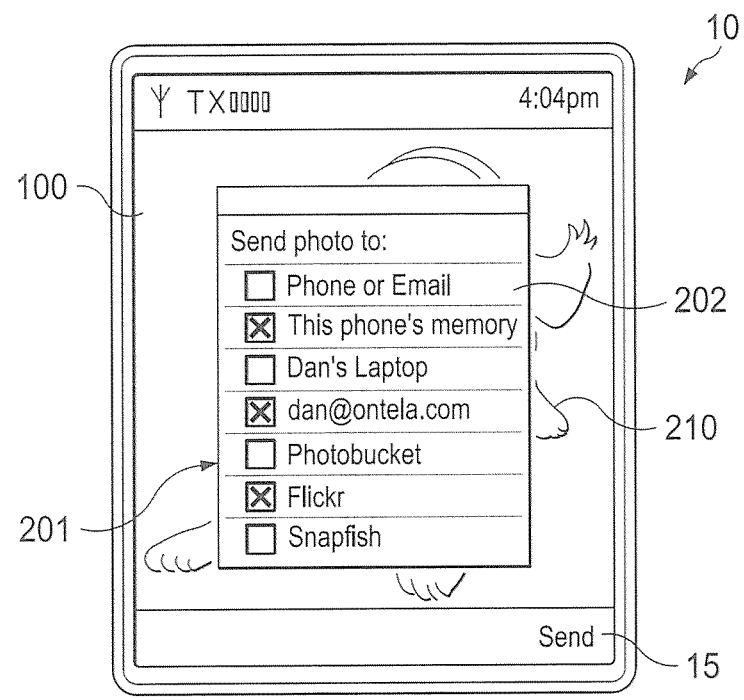

Assuming SEND button 15 has been chosen, indicating that the user wishes to manually select locations for their photos, then FIG. 2C shows message 201 which allows the user to select various options, many of which have been tailored to this specific user, or to this specific device. FIG. 2C shows various locations where the captured photo can be delivered depending upon the user's answers to the presented options. One option for the user is to simply enable SEND key 15 again and the system would take advantage of certain pre-set destinations, such as the destinations that were last used and which are shown as being pre-checked. Note that all relevant types of media destinations can be presented together in one place. These media destinations can be, for example, specific phone numbers, email addresses, online services, social networks, web services, applications, etc. Such "mixed" media destinations and delivery modes are important since they provide all relevant destinations at a glance for the user to validate and use.

Figure 2D:
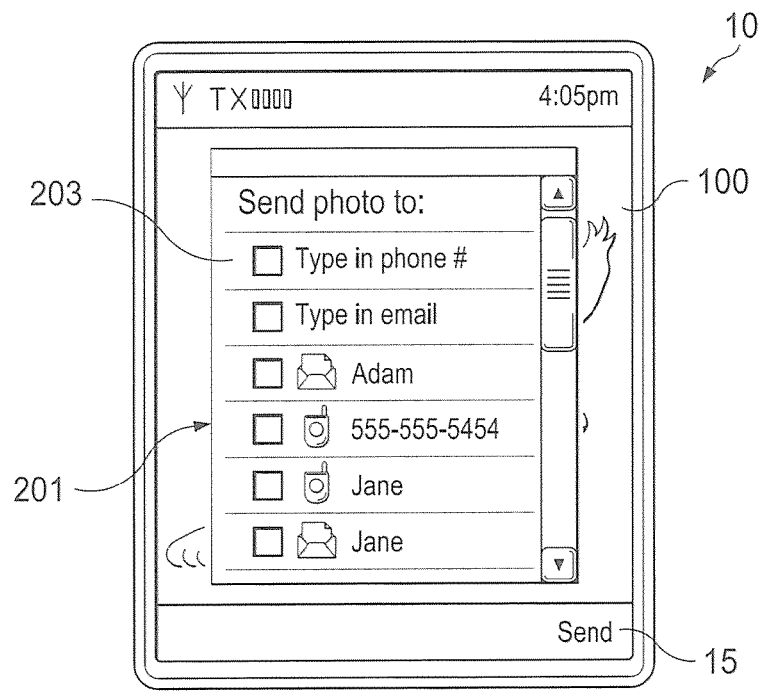
Figure 2E:
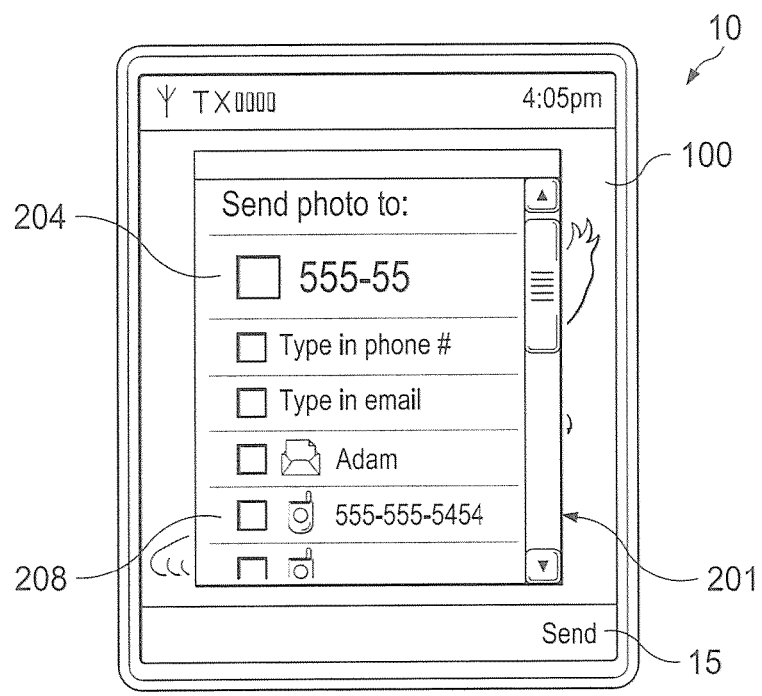

If this user desires to add a phone number or other address information then the user can tap the desired option, such as on line 202, which then presents the user with another message screen, such as shown on FIG. 2D where the user can pick from recently called phone numbers or recently accessed email addresses or other locations from a variety of sources: the local address book on the device, or any number of address books available on the network for example a Microsoft Exchange address book, a list of friends from a website like www.facebook.com, or a list of contact from an instant messaging service like MSN Messenger. These address books may also imply a transport protocol; for example, sending a photo to a friend on the website www.facebook.com may mean obtaining their email from the website and sending it via email, or it might actually mean posting it to the website and alerting the user of its presence. The device may need to format or process a media item in accordance with one or more formats necessary for delivery to a specific location, or even for use on the user's device (for example, as a background). The media may be sent, for example, to my Facebook account or a friend's Facebook account, or it may look up an address on Facebook and send the media to that address. If the user wishes to add a phone number then line 203 is selected and the message as shown in FIG. 2E appears along with a keypad (not shown). The user can then enter the desired number as shown in line 204 (in this case 555-55 is displayed as a phone number in the process of being entered). Note that line 208 shows a "probable" number that has come from a stored database while the user is in the process of inputting the number in box 204. The numbers can be entered using the device keypad or by voice entry, or in any other manner. Note that the user can enter his/her own pre-stored contact list and select an already stored number if desired. As the desired number is being input, the list of available phone numbers matching the partially dialed number, such as the number shown in line 208, can appear to cut short the dialing time. Note that contacts, such as Jane, that had appeared on the list could be made to disappear if the underlying number for Jane does not match the number being entered. Matches may also be made by considering the alphabetical equivalent of numbers entered, for example "2 for ABC", or by considering letters entered in the case of a keyboard or other mechanism for entering letters. By combining recently used contact information from the device's communication history along with contact information from one or more address books, the user is provided with a complete set of convenient and easily selected choices of where to send the current media item.

Figure 2F:
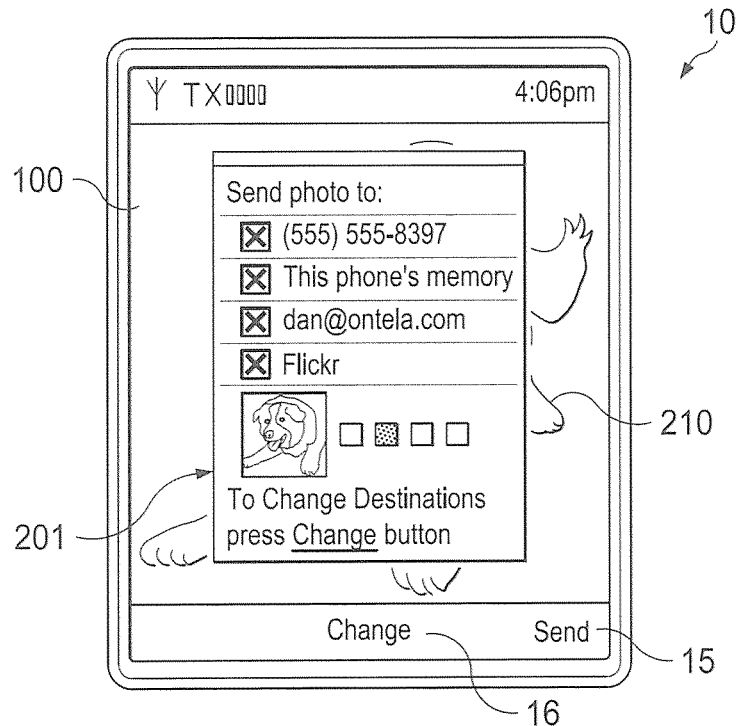
Figure 2G:
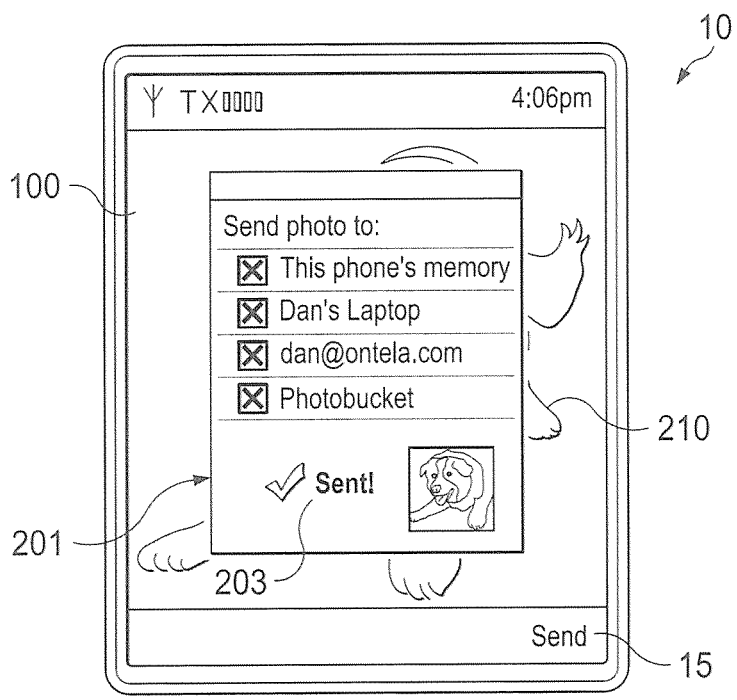

Once the phone number, email address, website user account, etc., has been entered completely, the user presses SEND button 15 and the screen reverts to the screen shown in FIG. 2F that is very similar to the screen shown in FIG. 1C. This new screen contains the actions about to be taken, including the phone number or other information, that has just been entered. The user can now choose SEND again to confirm these destinations and immediately send the photo. If the user does nothing further, i.e., does not enable Change button 16, then the system automatically (potentially after a time-out period) sends the photo to the desired locations as shown in FIG. 2G. A confirmation message, such as message 203, can be displayed indicating that the desired action has been achieved.

Figure 2H:
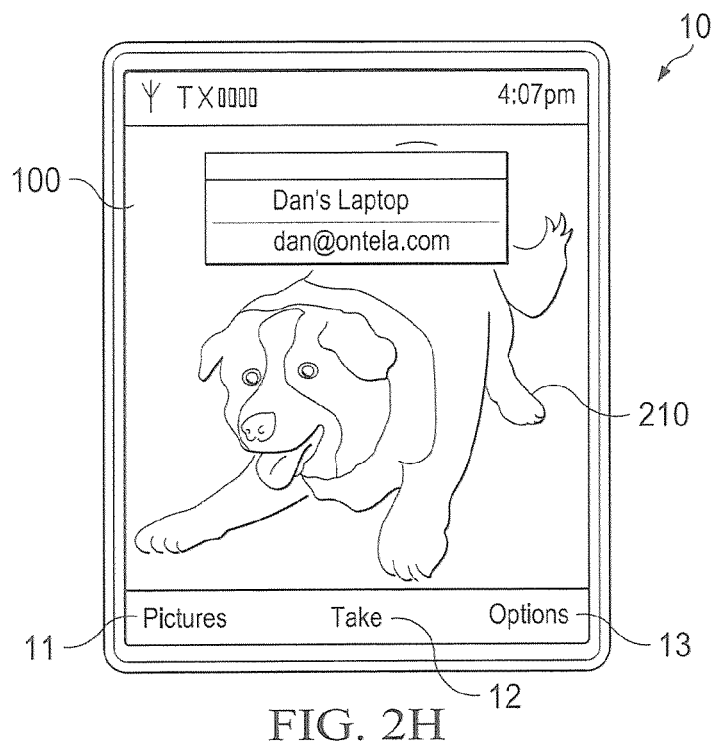

FIG. 2H illustrates that the user interface (UI) message previous shown to the user (FIG. 2G) is fading and the device is back to being able to take live pictures as it had been in FIGS. 1A and 2A.

Figure 3A:
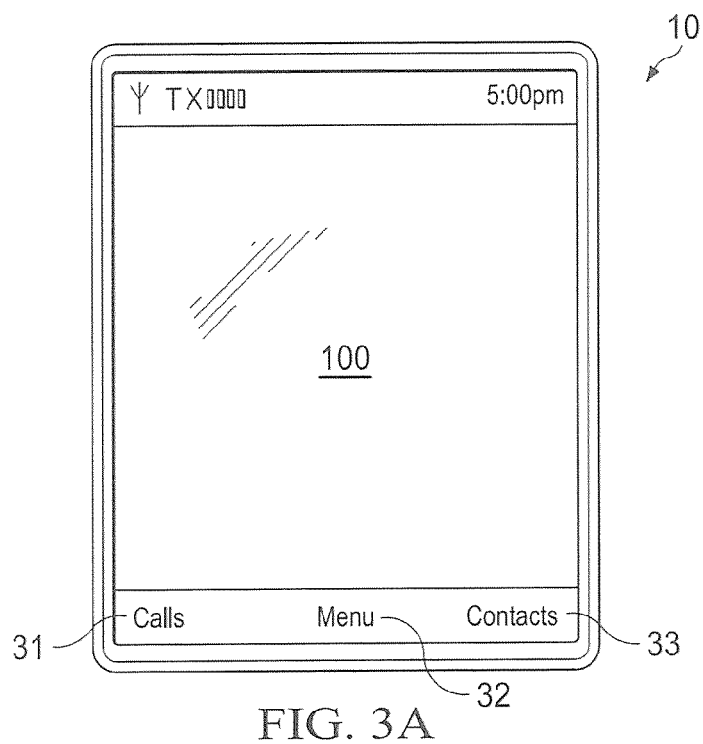
FIGS. 3A to 3D illustrate the operation of the system when a photo, or other media, arrives from an external source.

FIGS. 3A to 3D illustrate the operation of the system when a photo, or other media, arrives from an external source, such as being sent via email or Bluetooth. FIG. 3A shows the device in the home screen mode, perhaps with a logo of the wireless network operator or one or more logos (tiles) of applications available on the device.

Figure 3B:
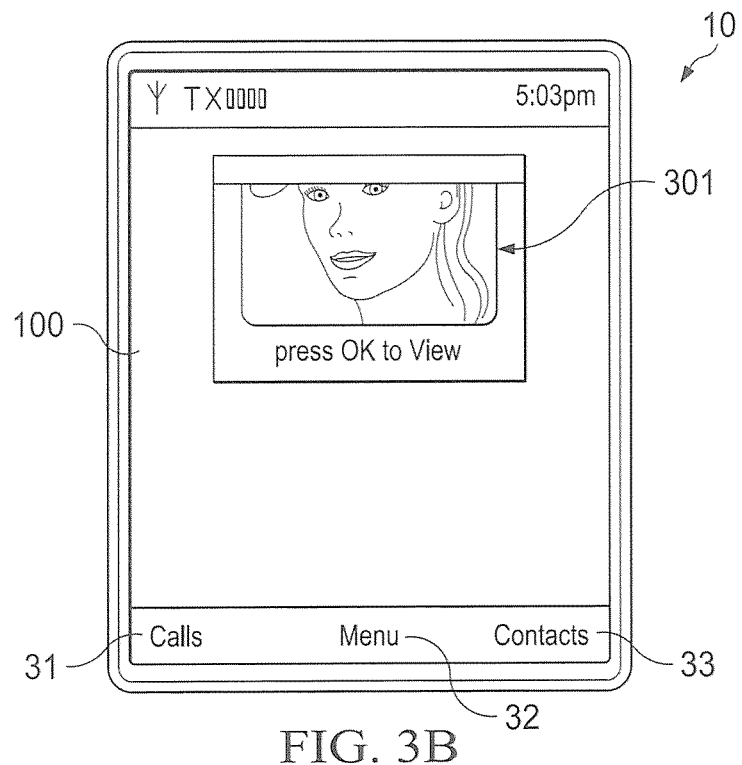

In FIG. 3B a photograph (or any media data, including video), such as photo 301, from a third party is beginning to appear. If desired, the new incoming data could be animated, for example, glide in from the side and uncurl itself, or it simply could appear, or an icon or thumbnail could appear indicating that a message is available.

Figure 3C:
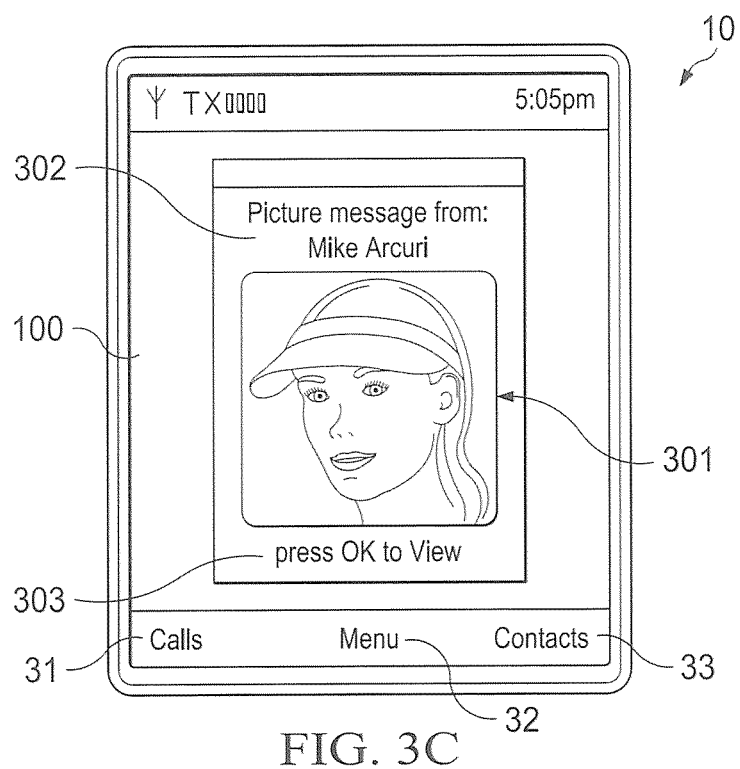
Figure 3D:
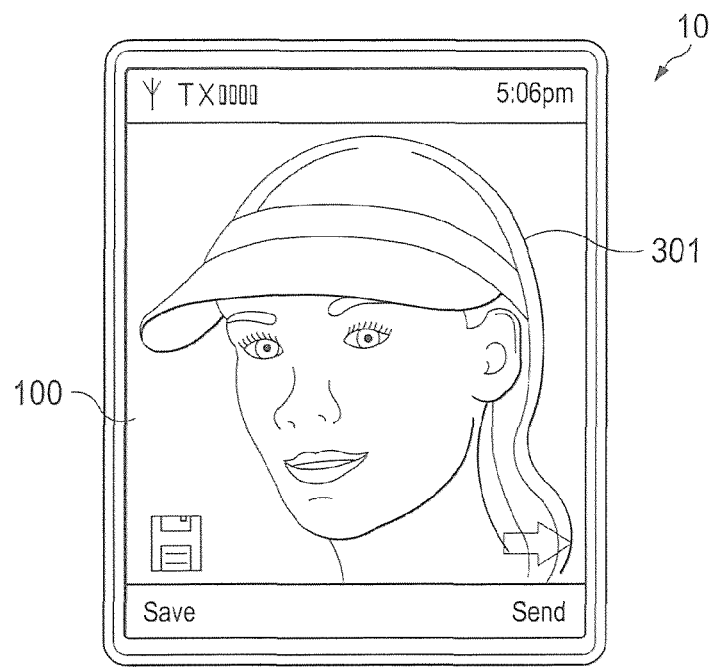

In FIG. 3C a preview of the data that has arrived is visible. Together with media 301, other information 302 pertaining to the source of the media can be presented. If the user desires to see the entire media (whether as a single frame, video, text, etc.) the user presses line 303 (or some other button) and FIG. 3D appears showing the full media content. It is noteworthy that the same consistent implementation of the SEND command (and the associated user interface sequence) shown in FIGS. 2A-2H is available when the media is viewed. This consistent implementation of the SEND ability throughout the full interface of the device is advantageous to the user who will quickly gain familiarity with the controls, and also useful for wireless operators, who benefit from increased messaging traffic from their users.

Figure 4:
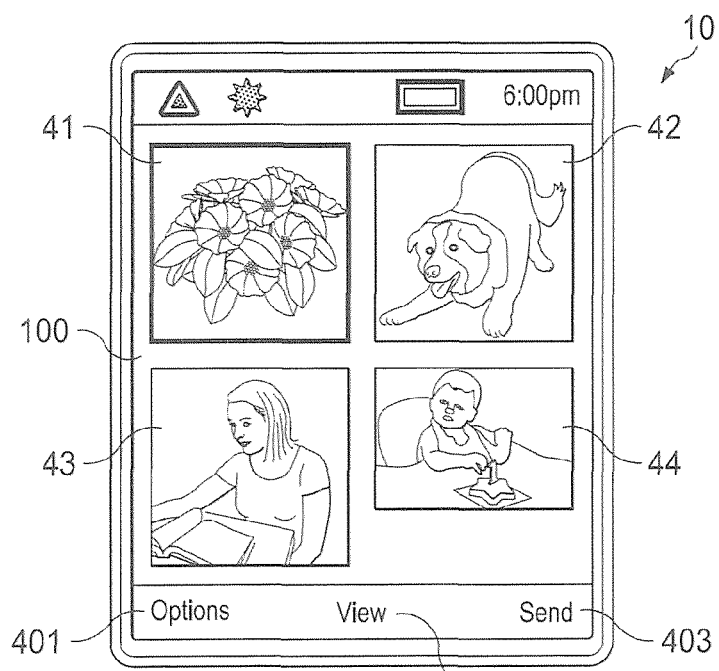
FIG. 4 illustrates that the system can be used for delivering media from a gallery or database.

FIG. 4 illustrates that the system can be used for delivering or processing media from a gallery or database, whether the database is on the device or off the device. FIG. 4 shows four recently taken photos 41-44 that are available to the device, locally or via a network request. By selecting any one or more of the photos, by touching the selected photo or otherwise, SEND button 403 can be used to begin the process discussed above with respect to FIGS. 1A-1C, 2A-2H and 3A-3H. Here photo 41 is selected for a wallpaper application. As noted above, this consistency benefits the user and adds revenue to the wireless operator because of the traffic increase when the user sends the media. Note that one or more of the displayed media in FIG. 4 can be media that has arrived from an external source as discussed with respect to FIGS. 3A-3D.

Figure 5:
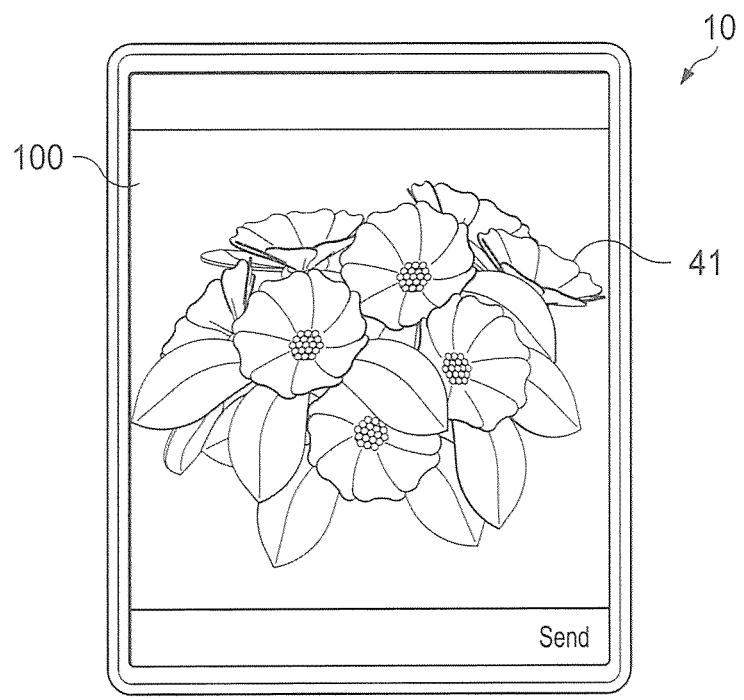
FIG. 5 illustrates that any selected photo, or other media, can be used for a variety of purposes.

FIG. 5 illustrates that any selected photo, or other media, such as photo 41, can be used for wallpaper, or the gallery, or a portion of the gallery, or could be used as a slide show, if desired. Automated slide shows of on-device photos when the device is not being actively used by its owner are enjoyable to the device owner, and may spur increased usage of the SEND feature which provides an array of choices, such as click to SEND to a pre-established location or to allow the user to select from an existing address mail list with a minimum of "clicks". The control for such an operation is the single SEND button discussed above. Note that multiple options can be presented to the user a the same time and that the user can select multiple options for concurrent processing.

Figure 6:
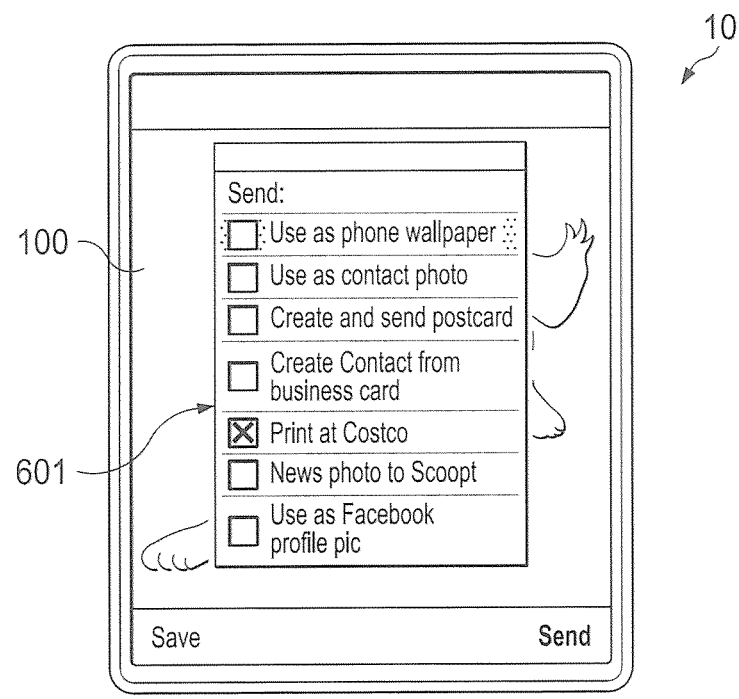
FIG. 6 illustrates types of destinations that become practical when photos are not simply stored in a database.

FIG. 6 illustrates types of destinations that become practical when photos are not simply stored in a database. Message 601 would be used, for example, in conjunction with the selection of photo 41, FIG. 4, to create the wallpaper of FIG. 5. Note that some of the possible destinations (of which FIG. 6 is only a partial list) are not simply internet sites or PCs, or even phones, but actions that may be accomplished with the photo itself. Wallpaper would be one such action. Also, in some situations a particular application would have a set of parameters associated with the media. For example, Twitter requires that the profile picture be less than a certain number of pixels. This application can then trim the photo to meet the requirements of the target site. Some applications are multi-step, such as sending a physical paper postcard of a picture to an address. Such complicated operations can be accomplished directly, via middleware or a middle tier server or internet service, or via an external internet site (such as SnapFish) on a photo by photo basis. This processing can also be accomplished on the device if desired.

Figure 7:
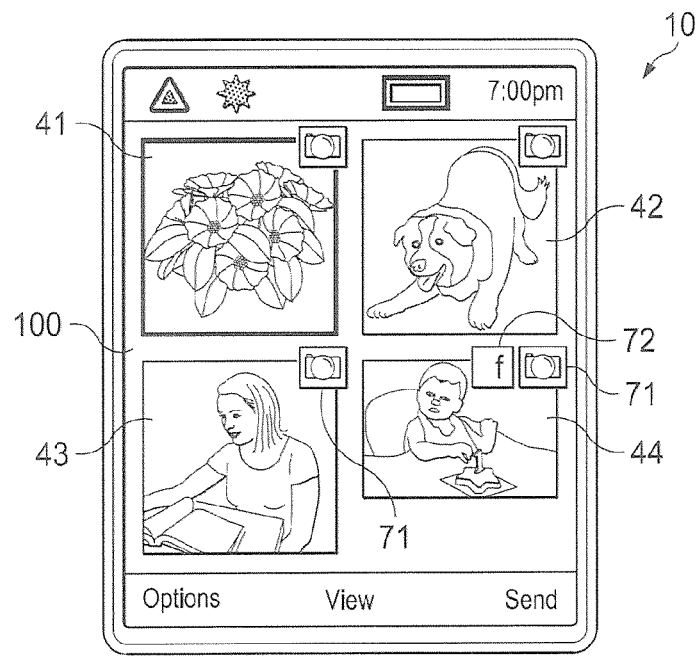
FIG. 7 illustrates four photos from the photo gallery.

FIG. 7 again illustrates four photos from the photo gallery. These photos can be the most recent, or they can be user selected according to a theme. Note that each photo contains a source for the photo showing that the gallery is not limited to only photos or media gathered by the device but can display media from multiple input sources. The gallery can be aggregated or collected from the many destinations that the user has configured. The desired media (or a thumbnail of it) can be obtained when the device uploads to a particular site, or the data can be pulled from various sites as desired. Thus, the user's device can be set to access the user's various accounts, such as Photobucket, Facebook, etc., accounts. Once the media is on the user's device, the user can go to a selected image, such image 43, and see that in the top right corner there is logo 71 of Photobucket. Photo 44 shows two icons, 71 and 72, indicating both a Photobucket and a Facebook logo. The media image markings indicate to the user that this particular image is stored in both locations. A local device icon (not shown) can be used to show that the media is stored on the user's own device as well.

Figure 8A:
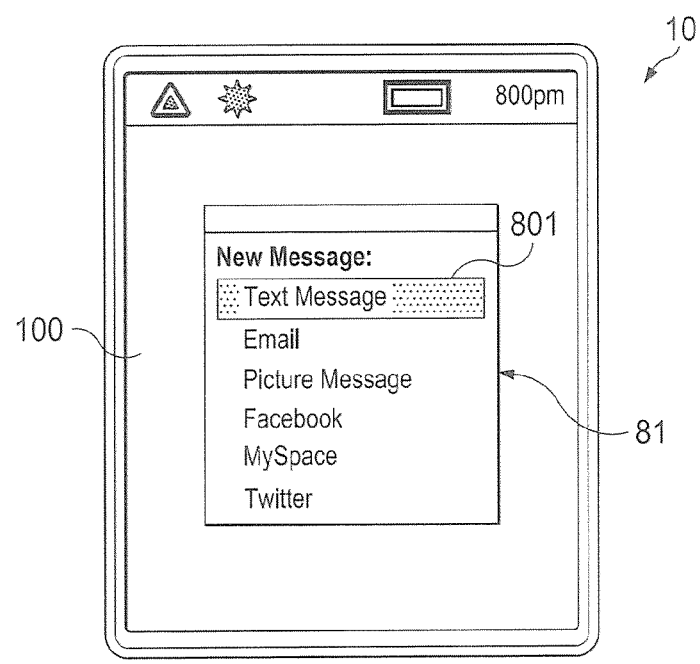
FIGS. 8A and 8B illustrate embodiments of screen messages and options.
Figure 8B:
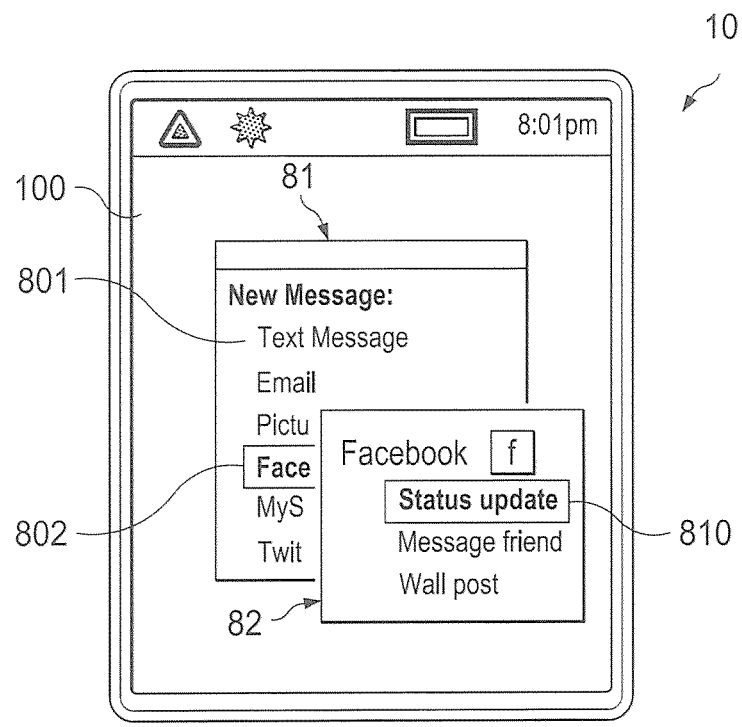

FIG. 8A illustrates one embodiment of a screen message, such as new message screen 81, that indicates to the user which message types are currently awaiting attention and, as will be seen in FIG. 8B, presents to the user a list of options which include third party Image Service Vendors ("ISVs") in addition to e-mail and allows the user to pick a message type (which could appear in a pop-up) unique to a selected type of message in an aggregated manner. As shown in FIG. 8A, text messaging is still the default choice for new messages, and is highlighted by default. But the user can choose message types specific to their social networks by moving the selection down the list. Note that the options can contain multiple categories, such as internet, phone to phone, local storage, on-device processing, and multiple categories can be concurrently selected by the user from the displayed option list.

FIG. 8B illustrates the situation where the user selects line 802 (Facebook). In such a situation, a menu of communication actions and message types unique to Facebook appears (as shown in menu 810). This menu then allows the user to interface with Facebook in one of several manners proscribed by the ISV. Thus, for every destination multiple unique message types can be used in an integrated manner for the user of the device.

In similar manner, when the user is sending media to a location, such as to a ISV or other internet location, it often occurs that the ISV has a particular format for the media itself, or a format for the exchange of media or other messages. The device stores in its database the protocols of such ISV's and when the user is in the process of sending media (such as would occur, for example, with respect to FIGS. 1C and 2F) the device uses the stored protocols to fashion the proper message format as well as to modify (if necessary) the actual media content. In this way, media captured on the device, or media received by this device (as discussed with respect to FIGS. 3A-3D), can be sent to one or more locations (either directly or via a third party server) in a straight-forward manner without manipulation and/or formatting by the user.

In another embodiment of the invention, the device itself disambiguates only between local and remote processing options for media, and for all remote processing options and delivery locations relies on a known, pre-established relay or middleware server which in turn handles all the ISV-specific requirements for media delivery and required formats.

Figure 9A:
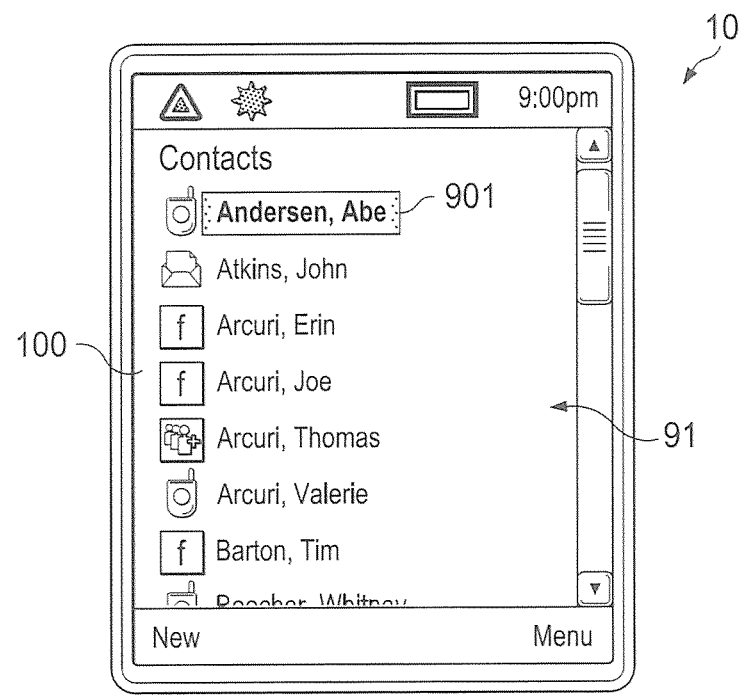
FIG. 9 illustrates one embodiment in which the user's address book is integrated into a common system with the other applications.

FIG. 9 illustrates one embodiment in which the user's local address book on the phone is integrated into a common system with remote address information from other applications. As shown, each name in the contact list is shown with icons indicating the source of the user's data and/or the mechanism for sharing with that user. Thus, not only are the names from the memory on the device (traditional address book) shown but those names are integrated with names from other social services, such as Facebook, MySpace, Twitter, etc. This then allows for the importation and synchronization of the locally based contacts with other services to present to the user one view of all the people the user interacts with. This then integrates the user's social network with the user's local database of names.

Figure 9B:
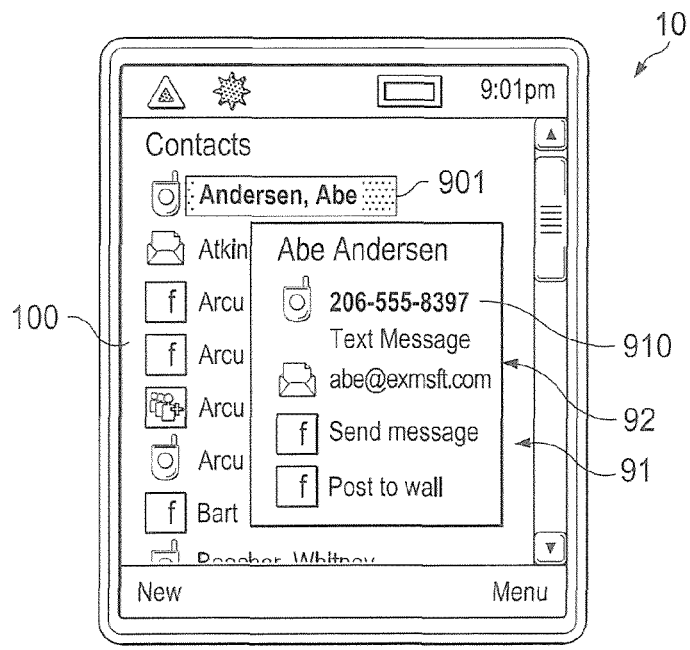

Assume now that the user selects line 901. FIG. 9B then illustrates an example of a pop-up message, such as message 910, in which the user is given several optional ways to interact with the selected contact name. This interaction includes a Facebook specific mechanism, as well as phone number, text message.

Typically, messaging between mobile devices is accomplished by SMS or MMS messaging. Most wireless handsets support SMS text messaging, and many phones support some variation of the MMS multimedia messaging standard. There are many ways to accomplish delivery of the messages described herein. A message may be relayed via the data network, for example via http communication with a server. The recipient may poll or be alerted via the data channel of the existence of this message. The message may be sent via MMS, either directly from the handset or by a server which has received the message over a data channel. The message may be degraded to SMS, for example simply providing a link to the message contents or providing an excerpt of the text from the message, relying on the user to view the link in a web browser to obtain the full message. Supported phones may register with a central database, for example on the messaging server, so that said server can determine the appropriate messaging protocol for a particular recipient.

Since MMS in many cases decreases the quality and the size of the media that's being sent, or has hard limits as to how large a photo can be, or has slow delivery times, or does not have inter-carrier capability, sending the message via the data channel is preferable. Other advantages to using this intelligent network range from more reliable and robust media delivery (due to retry policies which are tolerant of imperfect wireless networks and ISV internet services) to reduced costs for mobile operators.

Figure 10:
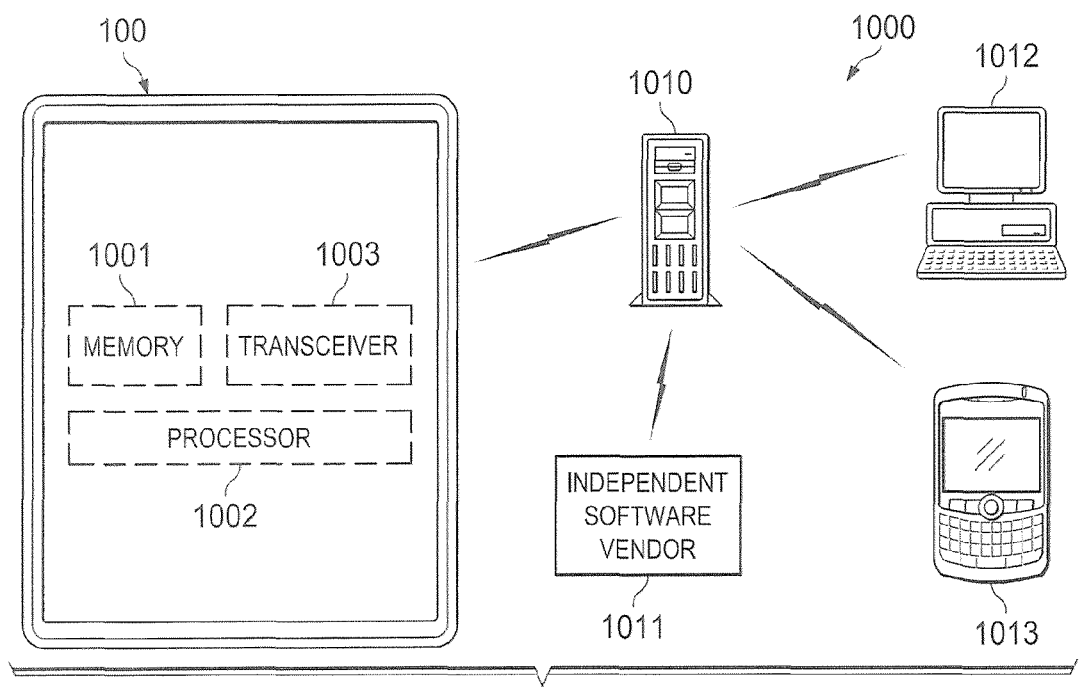
FIG. 10 illustrates one embodiment of the connections between components in the system.

FIG. 10 illustrates one embodiment 1000 of the connections between components in the system. As shown, mobile device 100 contains memory 1001, CPU 1002 and transceiver 1003 as well as other control circuitry, not shown. Application software runs on the processor to control the operation of the system and controls the communication with software on server 1010. This operation is consistent with the details provided in the above-identified co-pending applications such that media from device 100 is communicated to server 1010 and then Forwarded to one or more other locations in accordance with the specific user's pre-established instructions. Thus a photo from device 100 is sent to server 1010 and from server 1010 the photo could go, for example, to mobile device 1013, to ISV 1011, PC 1012 or to any other identified location or service.

Figure 11:
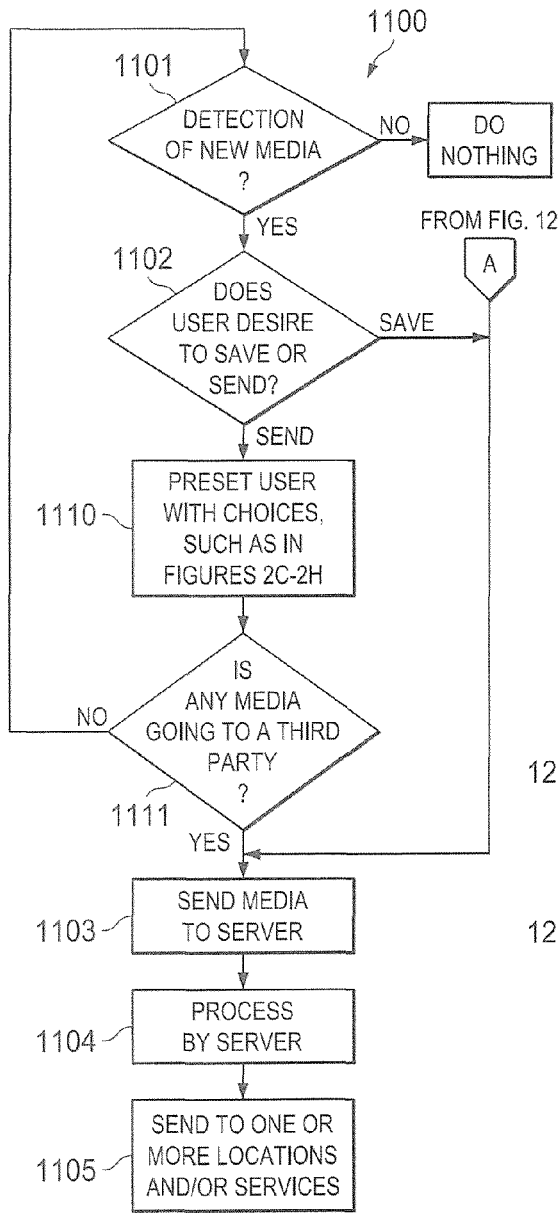
FIGS. 11, 12 and 13 show embodiments of code controlled processor operations.

FIG. 11 shows one embodiment 1100 (which can be code running in processor 1002 as contained in non-transitory memory 1001) for controlling the operations described in FIGS. 1A to 1C, such that process 1101 detects that a new picture or other media is available. As discussed above, if the user chooses to SAVE that picture then processes 1103, 1104 and 1105 process the media via an external server to one or more pre-identified locations. Process 1103 interacts with process 1102 such that the server returns a unique identifier ID that can be used for the picture that is to be sent. The server then signals to upload ad start the upload with the ID. The photo (or other media) is broken into packets and uploaded one at a time to the server. When the upload is complete and verified to be complete, the network connection shuts down and the device stops communicating with the server.

If the user desires to SEND the media then process 1110 presents the user with certain options as discussed-above with respect to FIGS. 2C-2H. If any media is to be sent to a third party, that media is first sent to the server in the manner discussed above. Note that the uploading to the server can occur in the background so as to not block further actions taken on the device by the user. The uploads can be timed to allow the user the reflect on his/her actions and to allow the user to perform other functions with the device.

The server operates to queue media, or to queue commands, for certain destinations so that the media can be delivered to those destinations. In the case of an individual PC destination, there is a queue which acts as a mailbox. For each media item intended for the PC a mailbox message is placed in the queue and the next time a PC client is turned on and initiates contact with the server, it checks this mailbox to see how many items to download. If media is intended to be sent out from the server through email or to internet websites, the server manages the queuing and execution and of queued commands. The server does not wait for an outside client to connect to it. For email for example, the server queues up the commands and the email service continually sends messages with attached media files. In the case of an ISV such as Photobucket, there is a module that handles the API level integration that defines the policies for trying and retrying. Once the media item is queued, the piece of the service that speaks Photobucket works its way through the queue. Queues can be stalled in the case that credentials don't work for the user or something is down temporarily at the external website. These situations are managed in a robust and automatic manner by the server. Note that the server itself is not an end destination for media. But rather, it is a system for delivering media in a reliable manner to as many destinations as are required.

Figure 12:
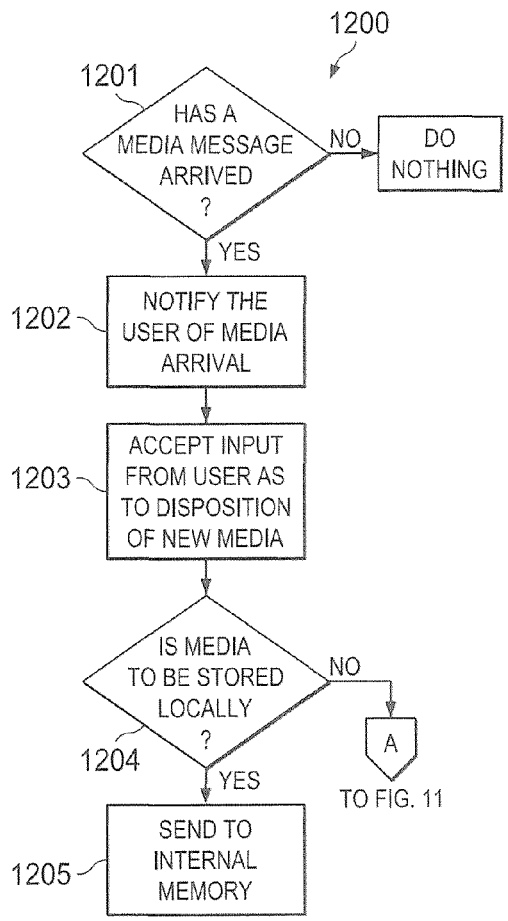

FIG. 12 shows one embodiment 1200 of a system for receiving media from a source external to the device. This external source can be any sending mechanism, such as another device, a PC, a server, a social network, etc. Process 1201 determines when such a media laden message has arrived at the device. Process 1202 notifies the user, by a visual and or audible message. Process 1203 then accepts input from the user as to what disposition the user wants to make of the newly arrived media. If the media is to be stored locally, then process 1205 controls the storage. In addition, the media might be sent to one or more remote locations and if so then processes 1103-1105 of FIG. 11 are utilized.

One manner of notifying the user's device of a new message to display is by using SMS messages that activate the message viewing application (e.g., port directed SMS to an on-device client application). Under such a scenario, a property of the message is that the receiving device will send the data embedded inside, (such as header data embedded inside the message that is being sent as a text message) to the various device platforms known to handle that type of message. The platform finds the proper locally running and registered application, which then knows to present the user with a message of a certain type, In this case, it is the message shown in FIG. 3B that there is media waiting for the user and it would present its user interface for the user to interact with.

Figure 13:
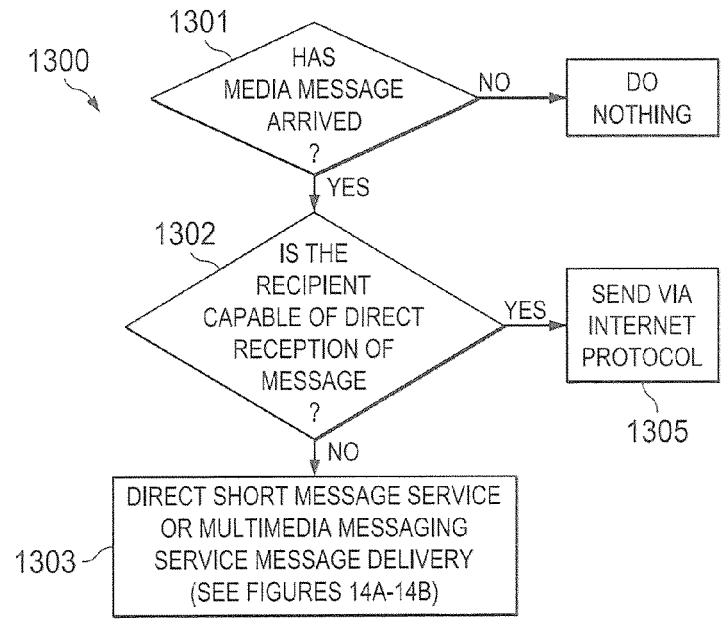

As discussed above, compatibility with handsets that do not have software that explicitly supports this functionality is a significant consideration and FIG. 13 illustrates one embodiment 1300 for handling such a problem. Process 1301, at the server, such as server 1010 shown in FIG. 10, determines if the recipient can receive media messages directly from the server of the type contained in this incoming message. This determination can be made, for example, by telephone number or by email address, or by any other method, such as database look-up. If the recipient is capable of receiving media via an internet communication then process 1303 processes the link to deliver the media to the designated location. This designation can come from the user at device 100 or from an internal pre-established destination list specific to this user or to an address identified by the user.

In the situation where the media can not be delivered via the internet then SMS or MMS delivery must be made in another manner. Example of other delivery methods are illustrated in accordance with either FIG. 14A or 14B.

Figure 14A:
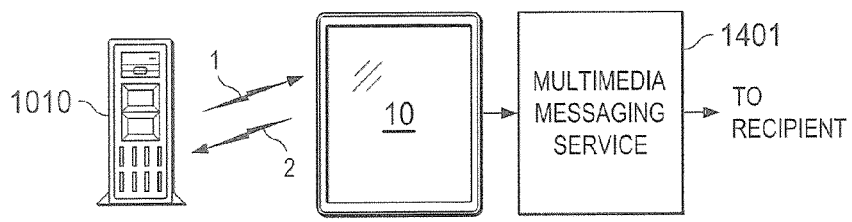
FIGS. 14A and 14B show embodiments of alternate media delivery networks.

In FIG. 14A, user's device 10 uploads the media to server 1010. The uploaded message contains the destination number as well as other data. The server (or an auxiliary server) looks up the phone number and finds no internet account for that phone number as discussed above. In this situation a messages is sent back to device 10 that server 1010 is unable to deliver the media to at least one of the recipients. Device 10 then enables MMS 1401 and launches the MMS application on the device. The MMS application then delivers the media if it can.

Figure 14B:
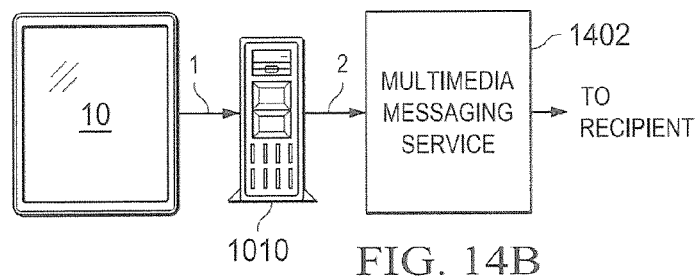

FIG. 14B illustrates an alternative delivery method in which server 1010, upon determining that it can not deliver a media message to a location enlists MMS application 1402 and the media message is delivered, if possible, via the MMS application directly from server 1010.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of controlling the processing of media presented on a wireless device, said method comprising:
    displaying to a user of said device certain media contained on said device; wirelessly sending said certain media, by said device, to a pre-selected remote processor, wherein said sending occurs without said user initiating said sending;
    presenting to said user a list of processing options for each of said certain displayed media while said media is so displayed, said list presented to said user while said media is so displayed on said device, allowing said user to select more than one of said options simultaneously while said media is so displayed on said device; and
    concurrently processing each said identified media in accordance with selected ones of said options.

2. The method of claim 1 wherein said locations are selected from the list of: email addresses, mobile devices, internet services, internet accounts.

3. The method of claim 1 further comprising:
    delivering said media for processing at external locations via a wireless link to a server intermediate between said device and said external locations, said server known to said device at a point in time prior to said displaying.

4. The method of claim 3 wherein said server is known to said device independent of input from said user.

5. The method of claim 3 wherein said list of processing options contains options for sending said captured media to external locations without regard to the type of location and without regard to a protocol necessary for delivering said media to said external locations.

6. The method of claim 4 wherein at least one of said options is a location for distribution of said media.

7. The method of claim 1 wherein said processing options comprise two or more of the following categories: pre-identified location particular to the user; a phone number, an internet destination, a specific account on an internet destination, a computing device such as a PC, an email inbox, a function implemented on the local device such as "make this my background," an existing address list particular to said user.

8. The method of claim 7 wherein said processing can be either internal to said device or external thereto.

9. The method of claim 8 further comprising: delivering said media to an external location via an internet protocol when possible and via a MMS network when said internet protocol is not available.

10. The method of claim 9 wherein when neither is possible, delivering only a link to and/or excerpt of said data which may be available elsewhere.

11. The method of claim 1 wherein at least one of said options is selected from the list of: distribution of said media to a social network; online photo-album website, web-based online service; e-mail address; a particular computer, pre-identified location particular to the user; a phone number, an internet destination, a specific account on an internet destination, a computing device such as a PC, an email inbox, a function implemented on the local device such as "make this my background," an existing address list particular to said user.

12. The method of claim 11 wherein at least one of said options is to format said media at said device in preparation for delivery of said media to a particular internet destination.

13. The method of claim 1 wherein said media comprises documents selected from the list of photos, videos, audio files, social network messages, email, documents, arbitrary files, text.

14. The method of claim 1 wherein one of said options is a SAVE option which sends documents to a pre-identified location; and
    wherein one of said options is a SEND option which allows said user to select other of said options.

15. A media capturing device, comprising:
    a viewer for displaying objects whose image a user desires to capture;
    a processor for wirelessly sending said certain media, by said device, to a pre-selected remote processor, wherein said sending occurs without said user initiating said sending;
    a processor operable upon capture of an image for causing image delivery options to be displayed on said viewer;
    said processor further operable for concurrently controlling delivery of said captured media in response to a plurality of delivery options selected by said user from said displayed options;
    said processor further operable for wirelessly sending said certain media to a processor for concurrent processing in accordance with the selected ones of said options.

16. The device of claim 15 wherein one of said options is a SAVE option and wherein said SAVE option results in said captured media being automatically sent wirelessly to at least one pre-established location separate from said device; and wherein one of said options is a SEND option and wherein said SEND option results in said captured media being delivered to one or more locations presented in a list to said user as part of said SEND option.

17. The device of claim 16 wherein said list contains user options selected from at least one of the following: a pre-established set of destinations; last-set of destinations used by this user; a set of interne destinations; address information from an address list; address information obtained from remote services; destinations of sites recently communicating with said device local processing options.

18. The device of claim 16 wherein said list contains user options selected from at least two of the following: a pre-established set of destinations; last-set of destinations used by this user; a set of internet destinations; address information from an address list; address information obtained from remote services; destinations of sites recently communicating with said device, local processing options.

19. The device of claim 17 wherein at least one of said delivery locations is accessible via identification information residing on said device and wherein said processor is further operable for presenting access to said stored numbers to said user via said viewer concurrently with displaying of said captured image.

20. The device of claim 19 wherein said identification information is obtained from at least one of the following: an address list stored on said device; information downloaded from a remote database; information obtained from an internet location; information obtained from a website; information obtained from a prior communication to said device from a source external to said device.

21. The device of claim 15 wherein said viewer is operable for displaying to said user visual identifications of media recently received without the user's explicit request to view such media at said device from locations remote from said device; and wherein said processor is further operable for presenting to said user a list of processing options for each of said displayed recently received media, said list allowing said user to select one or more of said options, and processing each said identified media in accordance with selected ones of said options.

22. The device of claim 15 wherein said viewer is operable for displaying to said user visual identifications of media recently captured without the user's explicit request to view such media at said device; and wherein said processor is further operable for presenting to said user a list of processing options for said displayed media, said list allowing said user to select one or more specific remote locations, and process said media in accordance with protocols unique to each said selected remote location.

23. Code contained on a non-transitory computer medium for controlling a processor on a wireless handheld device for performing the following method with respect to said device:
displaying to a user of said device certain media contained on said device;
wirelessly sending said certain media, by said device, to a pre-selected remote processor, wherein said sending occurs without said user initiating said sending;
presenting, on said device to said user, a list of processing options for each of said identified media, said list allowing said user to select more than one of said options at the same time, and
concurrently processing each said identified media in accordance with selected ones of said options.

24. The code of claim 23 wherein at least one of said options is a location for distribution of said media.

25. The code of claim 24 wherein said distribution locations can be either internal to said device or external thereto.

26. The code of claim 25 further comprising:
delivering said media to external locations via a wireless link to a server intermediate between said device and said external locations.

27. The method of claim 25 further comprising:
delivering said media directly to an external location via a wireless link without a server intermediate between said device and said external locations.

28. The code of claim 23 further comprising:
delivering said media to a remote location via an internet protocol when possible and via a MMS network when said internet protocol is not available.

29. The code of claim 23 wherein said certain media comprises media recently captured directly from said device.

30. The code of claim 23 wherein said certain media comprises media recently sent to said device from a location remote from said device.

31. The code of claim 23 wherein said certain media comprises a notification of media availability such that said user must take affirmative action to retrieve said media.

32. A method for storing media on a device, said method comprising:
displaying objects whose image a user desires to view;
wirelessly sending said certain media, by said device, to a pre-selected remote processor, wherein said sending occurs without said user initiating said sending;
displaying image delivery options to said user under control of a processor concurrently with viewed ones of said images;
allowing said user to select multiple delivery options simultaneously; and
concurrently processing selected ones of said delivery options.

33. The method of claim 32 wherein one of said options is a SAVE option and wherein said SAVE option results in said viewed media being automatically sent wirelessly to at least one pre-established location separate from said device; and wherein one of said options is a SEND option and wherein said SEND option results in said viewed media being delivered to one or more locations presented to said user as part of said SEND option.

34. The method of claim 32 wherein said displayed options contains user options selected from at least one of the following: a pre-established set of destinations; last-set of destinations used by this user; a set of internet destinations; address information from an address list; address information obtained from remote services; destinations of sites recently communicating with said device.

35. The method of claim 34 wherein at least one of said destinations is accessible via identification information residing on said device and wherein said processor is further operable for presenting access to said stored numbers to said user via said viewer concurrently with viewing of said image.

36. The method of claim 35 wherein said identification information is obtained from at least one of the following: an address list stored on said device; information downloaded from a remote database; information obtained from an interne location; information obtained from a website; information obtained from a prior communication to said device from a source external to said device.

37. The method of claim 32 wherein said displayed objects are of media recently received from remote locations without the user's explicit request to display such media; and wherein said processor is further operable for presenting to said user a list of processing options for each of said displayed recently received media, said list allowing said user to select one or more of said options, and
processing each said identified media in accordance with selected ones of said options.

38. The method of claim 32 wherein said options allow said user to select multiple categories of processor options.

* * * * *

UNITED STATES PATENT AND TRADEMARK OFFICE
CERTIFICATE OF CORRECTION

| | | |
|---|---|---|
| PATENT NO. | : 9,049,243 B2 | Page 1 of 1 |
| APPLICATION NO. | : 12/569313 | |
| DATED | : June 2, 2015 | |
| INVENTOR(S) | : Daniel J. Shapiro et al. | |

It is certified that error appears in the above-identified patent and that said Letters Patent is hereby corrected as shown below:

In the Specification:
At column 5, line number 43, delete "network for example" and replace with --network, for example--.
At column 9, line number 24, delete "Forwarded" and replace with --forwarded--.
At column 10, line number 18, delete "and or" and replace with --and/or--.

In the Claims:
At column 12, claim number 17, line number 57, delete "interne" and replace with --internet--.
At column 14, claim number 36, line number 46, delete "interne" and replace with --internet--.

Signed and Sealed this
Ninth Day of February, 2016

Michelle K. Lee
*Director of the United States Patent and Trademark Office*